United States Patent
Ono et al.

(10) Patent No.: US 9,067,758 B2
(45) Date of Patent: Jun. 30, 2015

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Takashi Ono, Aichi-ken (JP); Yasunori Hata, Aichi-ken (JP); Akira Sumiyashiki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 294 days.

(21) Appl. No.: 13/681,463

(22) Filed: Nov. 20, 2012

(65) Prior Publication Data

US 2013/0126658 A1 May 23, 2013

(30) Foreign Application Priority Data

Nov. 21, 2011 (JP) .................. 2011-254070

(51) Int. Cl.
| | |
|---|---|
| *B60R 22/38* | (2006.01) |
| *B65H 75/48* | (2006.01) |
| *B65H 75/44* | (2006.01) |
| *B60R 22/40* | (2006.01) |

(52) U.S. Cl.
CPC ............ *B65H 75/4428* (2013.01); *B60R 22/40* (2013.01); *B60R 2022/402* (2013.01)

(58) Field of Classification Search
USPC .......... 242/384.4, 384.6, 383.2; 297/478, 480
See application file for complete search history.

(56) References Cited

U.S. PATENT DOCUMENTS

| 5,882,084 A * | 3/1999 | Verellen et al. ............... 297/478 |
| 7,090,304 B2 * | 8/2006 | Delventhal et al. ............ 297/478 |
| 7,637,536 B2 * | 12/2009 | Delventhal et al. ............ 280/806 |

FOREIGN PATENT DOCUMENTS

| EP | 0046308 A1 | 2/1982 |
| GB | 2309785 A | 6/1997 |
| JP | 10203309 | 8/1998 |
| JP | 10291461 A | 11/1998 |
| JP | 2009274613 A | 11/2009 |

OTHER PUBLICATIONS

Extended European Search Report of Mar. 13, 2012 issued in corresponding EP application No. 12193344.4.
JP Office Action dated Feb. 10, 2015 and English translation of Notice of Reasons for Rejection.

* cited by examiner

*Primary Examiner* — Emmanuel M Marcelo
*Assistant Examiner* — Angela Caligiuri
(74) *Attorney, Agent, or Firm* — Roberts Mlotkowski Safran & Cole P.C.

(57) ABSTRACT

An acceleration sensor of a webbing take-up device is provided with a sensor housing in which a spherical body is placed. A rotating shaft is formed at a longitudinal wall of a support wall of the sensor housing, and rotatably supported at a shaft receiving hole formed in a hanger support wall. A position of formation of the rotating shaft is set to be upward relative to a center of gravity of the sensor housing whose state where a sensor lever is installed at the support wall and the spherical body is placed on a curved-surface of a placing portion. Consequently, even without a heavy body being attached at the lower side of the spherical body or the lower side of the sensor housing, the sensor housing rotates responsively when the take-up device main body is tilted. Therefore, the acceleration sensor can be reduced in size.

2 Claims, 4 Drawing Sheets

WEBBING TAKE-UP DEVICE

CROSS-REFERENCE TO RELATED APPLICATION

This application claims priority under 35 USC 119 from Japanese Patent Application No. 2011-254070 filed Nov. 21, 2011, the disclosure of which is incorporated by reference herein.

BACKGROUND OF THE INVENTION

1. Field of the Invention

The present invention relates to a webbing take-up device that structures a seatbelt apparatus of a vehicle.

2. Related Art

An acceleration sensor is provided at a webbing take-up device that structures a seatbelt apparatus of a vehicle. When the vehicle decelerates sharply, the acceleration sensor operates a lock mechanism in order to restrict rotation of a spool in a pull-out direction. This kind of acceleration sensor has a structure in which an inertial body moves by inertia when the vehicle sharply decelerates, and the lock mechanism is operated by the inertial movement of the inertial body.

A webbing take-up device disclosed in Japanese Patent Application Laid-Open (JP-A) No. 2009-274613 (patent document 1) is incorporated in a seatback of a seat that has a reclining mechanism. Consequently, the attitude of the webbing take-up device tilts in accordance with inclination of the seatback. In the webbing take-up device disclosed in the patent document 1, a sensor case that supports the inertial body of the acceleration sensor is configured so as to be kept horizontal by its own weight irrespective of the attitude (tilt) of the webbing take-up device.

The acceleration sensor of the webbing take-up device disclosed in the patent document 1 is provided with a weight portion at the lower side in order to lower the center of gravity of the inertial body. As a result, the inertial body, and hence the acceleration sensor, is increased in size.

SUMMARY OF THE INVENTION

In consideration of the situation described above, the present invention is to provide a webbing take-up device that enables a reduction in size of an acceleration sensor that is provided to be rotatable with respect to a take-up device main body.

A webbing take-up device according to a first aspect of the present invention includes: a take-up device main body, that includes a spool that takes up a webbing by rotating in a take-up direction, and a lock mechanism that, by being operated, restricts rotation of the spool in a pull-out direction opposite to the take-up direction; and an acceleration sensor at which an inertial mass body is placed, the inertial mass body operating the lock mechanism by moving inertially due to a sharp deceleration of a vehicle, the acceleration sensor including a housing that is provided at the take-up device main body such that the housing is rotatable about a predetermined rotating axis with respect to the take-up device main body, According to the webbing take-up device of the first aspect, when the vehicle sharply decelerates in a state in which the webbing has been pulled out from the spool of the take-up device main body and applied to the body of an occupant sitting on a seat, the inertial mass body placed in the housing of the acceleration sensor moves by inertia. When the inertial mass body moves inertially, the lock mechanism of the take-up device main body is operated. When the lock mechanism operates, rotation of the spool in the pull-out direction is restricted, and thus pulling out of the webbing from the spool is restricted. Hence, the body of the occupant, which is acting to move forward in the vehicle by inertia, is strongly restrained by the webbing.

The acceleration sensor is rotatable about the predetermined rotating axis with respect to the take-up device main body, and the position of the center of gravity of the housing of the acceleration sensor, including the inertial mass body, is set to be at the lower side with respect to the position of the center of the rotating axis of the housing. Therefore, if the take-up device main body tilts about an axis whose axial direction is in the same direction as the rotating axis of the housing, the housing of the acceleration sensor acts to maintain the same attitude as before the take-up device main body tilted, and the housing relatively rotates about the rotating axis with respect to the take-up device main body. Therefore, the attitude of the housing of the acceleration sensor is maintained, and even when the take-up device main body is tilted, the acceleration sensor operates in the same manner as in the state before the tilting of the take-up device main body.

Further, because the shape of the housing and the like are specified such that the position of the rotating axis of the housing is disposed at the upper side with respect to the position of the center of gravity of the housing including the inertial mass body, there is no need to separately provide a weight in order to lower the position of the center of gravity of the inertial mass body, and there is no need to make the shape of the inertial mass body a particular shape. Therefore, this configuration is realized at low cost.

It is possible in the first aspect that a position of an axial center of the rotating axis of the housing is set at the upper side with respect to the most upward portion of the inertial mass body which is in a state in which the inertial mass body is placed on the housing.

In a webbing take-up device according to a second aspect of the present invention, in the first aspect, the housing includes a placing portion on which a spherical body that is the inertial mass body is rollably placed, the placing portion being formed in a recessed shape that opens toward a side of the rotating axis, and the position of the rotating axis is set such that the center of gravity of the housing including the spherical body is disposed between the placing portion and the rotating axis.

According to the webbing take-up device of the second aspect, the housing includes the placing portion with the shape of a recess that opens toward the rotating axis side with respect to the take-up device main body, and the spherical body that serves as the inertial mass body is placed on this placing portion. When the vehicle decelerates sharply, the spherical body rolls on the placing portion by inertia and rises up the recessed face of the placing portion. The lock mechanism is operated by this movement of the spherical body.

In the webbing take-up device according to the aspect, the position of the center of gravity of the housing including the spherical body is set to be between the placing portion on which the spherical body is placed and the rotating axis of the housing with respect to the take-up device main body. Therefore, even when the take-up device main body tilts, the attitude of the housing of the acceleration sensor is maintained, and the acceleration sensor operates in the same manner as in the state before the tilting of the take-up device main body.

In a webbing take-up device according to a third aspect of the present invention, in the second aspect, the position of the rotating axis is set at the upper side with respect to a position of the center of gravity of the spherical body which is in a state in which the spherical body is placed on the placing portion.

According to the webbing take-up device of the third aspect, because the spherical body is an inertial mass body that moves inertially when the vehicle sharply decelerates, the spherical body has a relatively large weight, and the position of the center of gravity of the housing including the spherical body is close to (near) the position of the center of gravity (center position) of the spherical body. Therefore, because the position of the rotating axis is set at the upper side with respect to the position of the center of gravity of the spherical body on the placing portion, the position of the rotating axis is set relatively easily.

It is possible in the second or third aspect that a position of an axial center of the rotating axis of the housing is set at the upper side with respect to the most upward portion of the spherical body which is in a state in which the spherical body is placed on the placing portion.

As described hereabove, a webbing take-up device according to the present invention enables a reduction in size of an acceleration sensor that is provided to be rotatable with respect to a take-up device main body.

BRIEF DESCRIPTION OF THE DRAWINGS

Embodiments of the invention will be described in detail with reference to the following figures, wherein.

DETAILED DESCRIPTION OF THE INVENTION

Structure of Present Exemplary Embodiment

Figure 4:
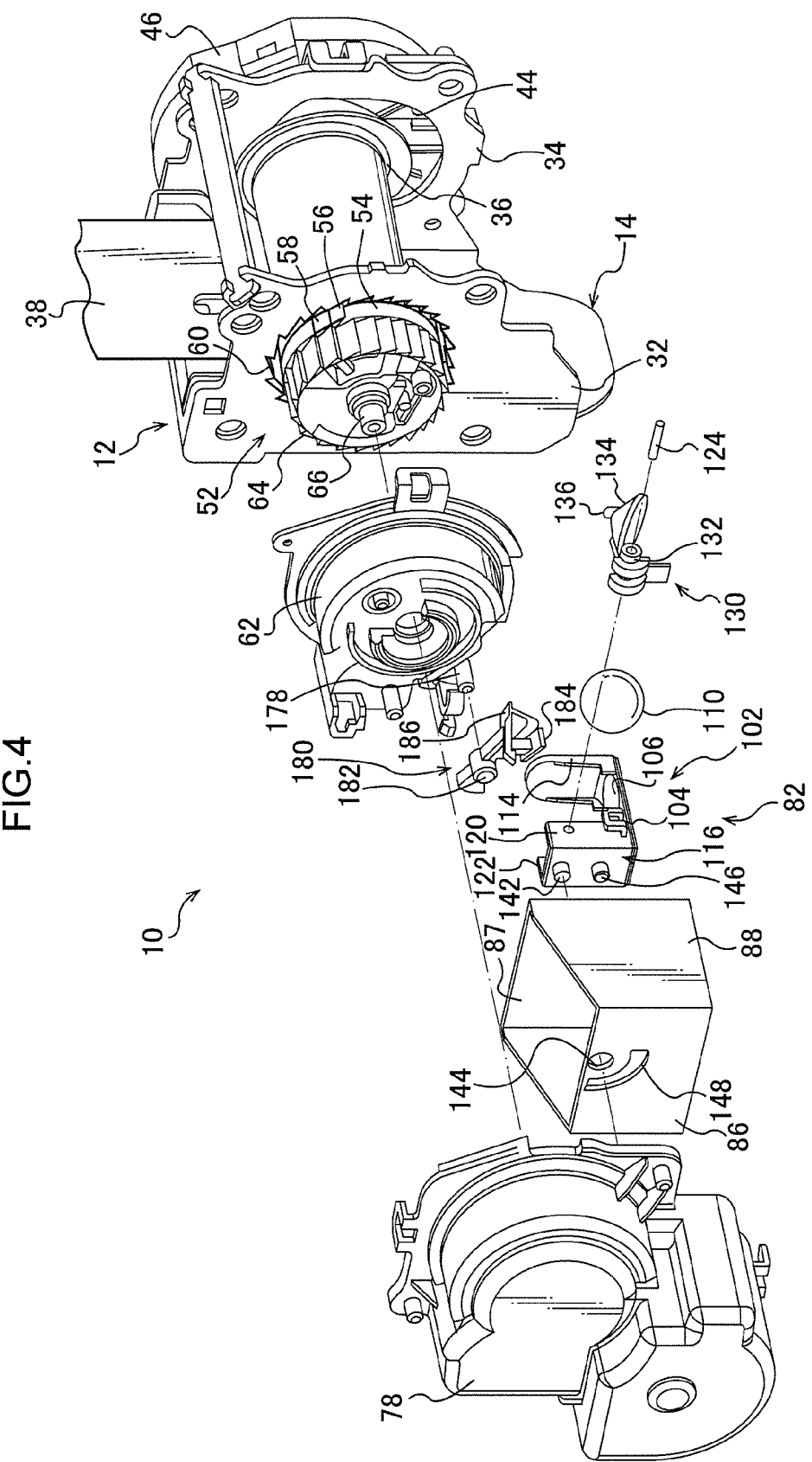
FIG. 4 is an exploded perspective view schematically showing the structure of the principal portions of the webbing take-up device in accordance with the exemplary embodiment of the present invention.

FIG. 4 shows the structure of a webbing take-up device 10 according to an exemplary embodiment of the present invention in a schematic exploded perspective view. As shown in this drawing, the webbing take-up device 10 is provided with a frame 14 that structures a take-up device main body 12. The frame 14 is integrally fixed by fastening with bolts or the like to a seatback frame (seatback skeleton) or the like that structures a seatback of a seat, which is not shown in the drawings, at the inside of the seatback.

The frame 14 is provided with a pair of leg plates 32 and 34. The leg plates 32 and 34 are each formed in a plate shape with a thickness direction along a width direction of the seatback, and oppose one another in the seatback width direction. A spool 36 is disposed between the leg plate 32 and the leg plate 34. The spool 36 is formed as a hollow shaft member whose axial direction is along the direction in which the leg plate 32 and leg plate 34 oppose one another.

A longitudinal direction base end side of a webbing 38 is anchored at the spool 36. The webbing 38 is formed in a long belt shape, a width direction of which is along the axial direction of the spool 36. When the spool 36 rotates in a take-up direction, which is one way about the central axis thereof, the webbing 38 is taken up onto an outer periphery portion of the spool 36 from the longitudinal direction base end side thereof and stowed. When the webbing 38 is pulled out toward the distal end side thereof, the webbing 38 that has been taken up onto the spool 36 is pulled out and the spool 36 rotates in a pull-out direction, which is opposite to the take-up direction.

A rod-shaped energy absorber member known as, for example, a torsion shaft or the like is provided at the inside of the spool 36. The energy absorber member is joined to the spool 36 at the leg plate 34 side of the spool 36 in a state in which relative rotation of the energy absorber member with respect to the spool 36 is restricted. The leg plate 34 side of the energy absorber member protrudes through a through-hole 44 formed in the leg plate 34 to the outer side of the leg plate 34 (the opposite side of the leg plate 34 from the side thereof at which the leg plate 32 is disposed).

A spring case 46 is mounted to the leg plate 34 at the outer side of the leg plate 34 (the opposite side of the leg plate 34 from the side thereof at which the leg plate 32 is disposed). A spiral spring that serves as a spool-urging member is accommodated at the inside of the spring case 46. A spiral direction outer side end of the spiral spring is anchored at the spring case 46, and a spiral direction inner side end of the same is anchored at the energy absorber member, directly or indirectly. When the energy absorber member rotates in the pull-out direction along with the spool 36, the spiral spring is wound and tightened up and, via the energy absorber member, urges the spool 36 in the take-up direction.

A lock base 54 that structures a lock mechanism 52 is provided at the leg plate 32 side of the spool 36. The lock base 54 is installed at a leg plate 32 side end portion of the spool 36, to be coaxially relatively rotatable with respect to the spool 36. The lock base 54 is connected to a portion at the leg plate 32 side of the aforementioned energy absorber member, in a state in which relative rotation of the lock base 54 with respect to the energy absorber member is restricted. Thus, the lock base 54 is connected to the spool 36 in a state in which relative rotation is restricted by the energy absorber member.

A pawl accommodation portion 56 is formed in the lock base 54. The pawl accommodation portion 56 opens at an outer periphery face of the lock base 54. A lock pawl 58 is provided at the inside of the pawl accommodation portion 56. The lock base 54 penetrates through a ratchet hole 60 formed in the leg plate 32. When a portion of the lock pawl 58 is disengaged from the pawl accommodation portion 56, a ratchet tooth formed at a distal end side of the lock pawl 58 meshes with ratchet teeth of the ratchet hole 60. In this state, rotation of the lock base 54 in the pull-out direction is restricted. Thus, rotation of the spool 36 in the pull-out direction is indirectly restricted.

A sensor holder 62 is mounted at the leg plate 32, at the outer side of the leg plate 32 (the opposite side of the leg plate 32 from the side thereof at which the leg plate 34 is disposed). A portion of the sensor holder 62 is formed in the shape of an opening with a floor, opening toward the leg plate 32 side, and a V-gear 64 is provided thereinside. A rod (shaft) portion 66 is protruded toward the sensor holder 62 side from the aforementioned energy absorber member, to correspond with the V-gear 64. The rod portion 66 is disposed to be coaxial with the spool 36, and the V-gear 64 is rotatably supported at the rod portion 66.

A spring, which is not shown in the drawings, is provided at the V-gear 64. A portion of the spring is engaged with the lock base 54. When the lock base 54 rotates in the pull-out direction, the spring is pushed by the lock base 54, and the spring pushes the V-gear 64 in the pull-out direction. As a result, the V-gear 64 may follow the lock base 54 and rotate in the pull-out direction. However, because the spring resiliently deforms, the lock base 54 may relatively rotate in the pull-out direction with respect to the V-gear 64. A portion of the aforementioned lock pawl 58 is engaged with the V-gear 64. Thus, in conjunction with the lock base 54 relatively rotating in the pull-out direction with respect to the V-gear 64, the lock pawl 58 moves in a direction to disengage from the pawl accommodation portion 56, and meshes with the ratchet teeth of the ratchet hole 60.

A sensor cover 78 is provided at the opposite side of the sensor holder 62 from the side thereof at which the leg plate 32 is disposed. The sensor cover 78 has a shape with a floor that opens toward the leg plate 32 side, and is mounted to the leg plate 32. An acceleration sensor 82 is provided at the inside of the sensor cover 78. The acceleration sensor 82 is provided with a hanger 84. The hanger 84 is provided with support walls 86 and 87. The support wall 86 and support wall 87 are formed as plate shapes that oppose one another in a direction the same as the axial direction of the spool 36 or in a direction that is inclined, about an axis whose axial direction is in the seat front and rear direction, to the seat up and down direction with respect to the axial direction of the spool 36.

Peripheral walls 88 are formed between the support walls 86 and 87. The peripheral walls 88 are formed along portions of the outer peripheries of the support walls 86 and 87. Thus, the hanger 84 has the shape of a hollow box that is opened at portions at which the peripheral walls 88 are not formed. By the support wall 87 being fixed to the leg plate 32, the hanger 84 is mounted at the frame 14, or at the sensor holder 62.

A sensor housing 102 is provided between the support wall 86 and support wall 87 of the hanger 84. The sensor housing 102 is formed as a whole by, for example, molding of a synthetic resin material (the entire of the sensor housing 102 is made from resin material). In the embodiment, a weight portion made of metal is not provided at the sensor housing 102. The sensor housing 102 is provided with a placing portion 104. A curved surface 106 is formed at a thickness direction upper side of the placing portion 104. The curved surface 106 is formed in a recessed shape that is curved so as to open upward, with a substantially circular shape in plan view. A spherical body 110, which serves as an inertial mass body, is placed on the curved surface 106. The spherical body 110 is formed of, for example, a metal such as steel, stainless steel or the like. The spherical body 110 has a mass significantly larger than the overall mass of the sensor housing 102.

In the exemplary embodiment of the present invention, a weight portion made of metal is not provided at the sensor housing 102.

In the present exemplary embodiment, a portion of the placing portion 104 on which the spherical body 110 is placed is the curved surface 106. However, the portion on which the spherical body 110 is placed need not be curved, provided the portion is a surface angled such that the spherical body 110 rolls and rises up by inertia, as described below.

A longitudinal wall 114 is provided standing upward from an end portion of the placing portion 104 at the support wall 87 side thereof. Correspondingly, a support wall 116 is provided at the support wall 86 side of the placing portion 104. The support wall 116 is provided with a longitudinal wall 118. The longitudinal wall 118 is provided standing upward from an end portion of the placing portion 104 at the support wall 86 side thereof, and opposes the longitudinal wall 114 in the direction of opposition of the support walls 86 and 87.

A lateral wall 120 is protruded toward the longitudinal wall 114 side from one width direction end of the longitudinal wall 118, and a lateral wall 122 is protruded toward the longitudinal wall 114 side from the other width direction end of the longitudinal wall 118. Thus, the support wall 116 has the shape in plan view of a recess opening toward the longitudinal wall 114 side thereof. A support shaft 124 is provided at a vicinity of an upper end portion of the support wall 116. The support shaft 124 is a shaft member whose axial direction is along a direction of opposition between the lateral wall 120 and the lateral wall 122. One end of the support shaft 124 is supported at the lateral wall 120 and the other end is supported at the lateral wall 122.

A sensor lever 130 is provided between the lateral wall 120 and the lateral wall 122. The sensor lever 130 is provided with a base portion 132. The above-mentioned support shaft 124 penetrates through the base portion 132. Thus, the sensor lever 130 is supported to be rotatable about the support shaft 124. The sensor lever 130 is also provided with a hat portion 134. The exterior shape of the hat portion 134 is formed in a flattened cone shape. A bottom surface of the hat portion 134 is a curved surface or angled surface with a recessed shape that opens toward the opposite side of the cone from the side at which the apex thereof is provided. The bottom surface of the hat portion 134 covers over the spherical body 110 placed on the curved surface 106 of the placing portion 104.

Thus, when the spherical body 110 approaches an edge portion of the curved surface 106 and rises up on the curved surface 106, the hat portion 134 rotates about the support shaft 124 so as to rise up. A pressing protrusion 136 is formed protruding substantially upward from the hat portion 134 (that is, at the opposite side of the hat portion 134 from the side thereof at which the bottom surface is provided). When the hat portion 134 rotates about the support shaft 124 so as to rise up, the pressing protrusion 136 pushes a V-pawl 180, which is described below, upward.

A rotating shaft 142 is formed at a vicinity of an upper end portion of the longitudinal wall 118 of the support wall 116. The rotating shaft 142 is formed to protrude, in a direction the same as the axial direction of the spool 36, from the face of the longitudinal wall 118 that is at the opposite side thereof from the side at which the longitudinal wall 114 is disposed. The rotating shaft 142 is rotatably supported at a shaft receiving hole 144 formed in the support wall 86 of the hanger 84. The position in the longitudinal wall 118 at which the rotating shaft 142 is formed is at the upper side relative to the face of the placing portion 104 at which the curved surface 106 is formed, and is at the upper side relative to the positional center (center position) of the spherical body 110 placed on the curved surface 106 (the most bottom (the lowest) portion of the curved surface 106) of the placing portion 104, in the vehicle upper-lower direction (vertical direction).

A guide pin 146 is formed protruding from the longitudinal wall 118 at the lower side relative to the position of the longitudinal wall 118 at which the rotating shaft 142 is formed. The direction of protrusion of the guide pin 146 from the longitudinal wall 118 is a direction the same as the direction of protrusion of the rotating shaft 142 from the longitudinal wall 118. The guide pin 146 is inserted into a guide hole 148 that is formed in the support wall 86 of the hanger 84.

The guide hole 148 is formed as a long hole that curves about the shaft receiving hole 144 as a center of curvature. The guide pin 146 is inserted at the inside of the guide hole 148. Thus, a range of rotating of the sensor housing 102 about the rotating shaft 142 is limited to between a position at which the guide pin 146 abuts against one longitudinal direction end of the guide hole 148 and a position at which the guide pin 146 abuts against the other longitudinal direction end of the guide hole 148.

Figure 1:
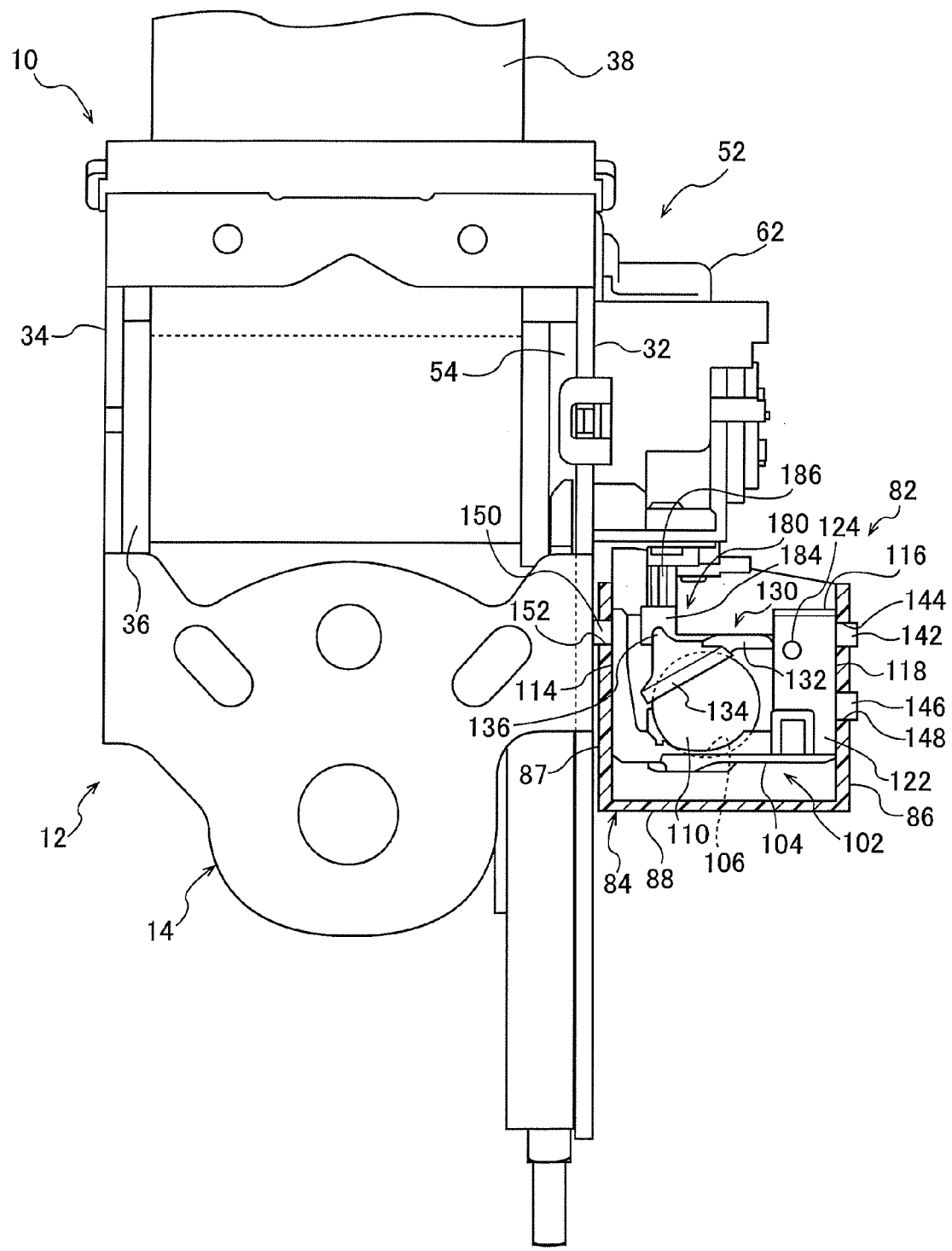
FIG. 1 is a rear view schematically showing the structure of principal portions of a webbing take-up device in accordance with an exemplary embodiment of the present invention.

As shown in FIG. 1, a rotating shaft 150 is formed at the longitudinal wall 114. The rotating shaft 150 is formed to protrude coaxially with the above-mentioned rotating shaft 142 from a face of the longitudinal wall 114 at the opposite side thereof from the side at which the longitudinal wall 118 is disposed. The rotating shaft 150 is rotatably supported at a shaft receiving hole 152 formed in the support wall 87 of the hanger 84.

The position in the longitudinal wall 118 of the support wall 116 at which the rotating shaft 142 is formed and the position in the longitudinal wall 114 at which the rotating shaft 150 is formed are set to be upward with respect to (relative to) the center of gravity of the sensor housing 102 which is in the state in which the sensor lever 130 is installed at the support wall 116 and the spherical body 110 is placed on the curved surface 106 (the most bottom (the lowest) portion of the curved surface 106) of the placing portion 104, in the vehicle upper-lower direction (vertical direction).

Further preferably, as shown in the drawings, in the vehicle upper-lower direction, a position of the axial center of the rotating shafts 142 and 150 is set upward than the highest portion (the most upward portion) of the spherical body 110 placed on the curved surface 106 (the bottom portion of the curved surface 106) of the placing portion 104.

A support shaft 178 is formed protruding from the sensor holder 62, to the opposite side of the sensor holder 62 from the side at which the leg plate 32 is disposed. The axial direction of the support shaft 178 is set to a direction the same as the axial direction of the spool 36. A base portion 182 of the V-pawl 180 is supported to be rotatable about the support shaft 178. The V-pawl 180 is provided with a pressed plate 184 in a plate shape. The pressed plate 184 is disposed at the upper side of the pressing protrusion 136 of the sensor lever 130. The size of the pressing protrusion 136 is specified such that a lower side face of the pressed plate 184 opposes the pressing protrusion 136 in the range of rotating of the sensor housing 102 about the rotating shaft 142 between the state in which the guide pin 146 abuts against the one end of the guide hole 148 and the state in which the guide pin 146 abuts against the other end of the guide hole 148.

The V-pawl 180 is also provided with an engaging hook 186. An opening, which is not shown in the drawings, is formed in the sensor holder 62 in correspondence with the engaging hook 186. A portion of the sensor holder 62 that accommodates the V-gear 64 communicates with the outside of the sensor holder 62 via this opening. When the sensor lever 130 rotates about the support shaft 124 so as to rise up and the pressing protrusion 136 presses the pressed plate 184 upward, the engaging hook 186 meshes with the ratchet teeth formed at the outer periphery portion of the V-gear 64. When the engaging hook 186 meshes with the ratchet teeth of the V-gear 64 thus, rotation of the V-gear 64 in the pull-out direction is restricted.

Operation and Effects of the Present Exemplary Embodiment

Next, operation and effects of the present exemplary embodiment are described.

In this webbing take-up device 10, when the vehicle decelerates sharply, the spherical body 110 on the curved surface 106 formed at the placing portion 104 of the sensor housing 102 of the acceleration sensor 82 rolls toward an edge portion side of the curved surface 106 and rises upward. The spherical body 110 rolling in this manner pushes the bottom surface of the hat portion 134 upward, rotating the sensor lever 130 upward about the support shaft 124.

When the sensor lever 130 rotates in this manner, the pressing protrusion 136 formed at the hat portion 134 pushes the lower face of the pressed plate 184 of the V-pawl 180 upward, rotating the V-pawl 180 about the support shaft 178. The engaging hook 186 of the V-pawl 180 rotating in this manner rises up, and meshes with the ratchet teeth formed at the outer periphery portion of the V-gear 64. Hence, rotation of the V-gear 64 in the pull-out direction is restricted.

Meanwhile, when the vehicle sharply decelerates, the occupant to whom the webbing 38 is applied inertially moves forward in the vehicle and the webbing 38 is pulled. When the webbing 38 is pulled, the spool 36 rotates in the pull-out direction. The lock base 54 is connected to the spool 36 via the aforementioned energy absorber member. Because relative rotating of the lock base 54 with respect to the spool 36 is restricted, the lock base 54 is rotated in the pull-out direction by the spool 36 rotating in the pull-out direction.

As described above, in the state in which relative rotation of the V-gear 64 in the pull-out direction is restricted by the engaging hook 186 of the V-pawl 180 meshing with the ratchet teeth of the V-gear 64, when the lock base 54 rotates in the pull-out direction together with the spool 36, there is a relative rotation of the lock base 54 in the pull-out direction with respect to the V-gear 64. When this relative rotation between the V-gear 64 and the lock base 54 occurs, the pawl accommodation portion 56 moves such that a portion of the lock pawl 58 protrudes from the pawl accommodation portion 56 formed at the lock base 54. As a result, the ratchet tooth at the distal end of the lock pawl 58 meshes with the ratchet teeth of the ratchet hole 60 formed in the leg plate 32.

When the ratchet tooth of the lock pawl 58 meshes with the ratchet teeth of the ratchet hole 60 in this manner, rotation of the lock base 54 in the pull-out direction, and hence rotation of the spool 36 in the pull-out direction, is restricted. In consequence, pulling out of the webbing 38 from the spool 36 is restricted, and the body of the occupant inertially moving forward in the vehicle may be effectively restrained by the webbing 38.

The present webbing take-up device 10 is incorporated in the seatback structuring the seat of the vehicle, as mentioned above. The seat of the vehicle is provided with a mechanism, known as a reclining mechanism, that inclines the seatback relative to the seat cushion about an axis whose axial direction is the width direction of the seatback. When the seatback inclines relative to the seat cushion, the take-up device main body 12 of the webbing take-up device 10 incorporated in the seatback rotates together with the seatback and tilts about the axis whose axial direction is the seat width direction, that is, the same direction as the axial direction of the spool 36.

In the webbing take-up device 10 of the present exemplary embodiment, the sensor housing 102 of the acceleration sensor 82 is rotatable about the rotating shafts 142 and 150 whose axial directions are in the same direction as the axial direction of the spool 36. Furthermore, the sensor housing 102 is an item molded of a synthetic resin material, and the spherical body 110 placed on the curved surface 106 of the placing portion 104 of the sensor housing 102 has a larger weight than weight of the sensor housing 102.

The position in the longitudinal wall 118 of the support wall 116 at which the rotating shaft 142 is formed and the position in the longitudinal wall 114 at which the rotating shaft 150 is formed are set to be upward with respect to (are set to be upward than) the position of the center of gravity of the sensor housing 102 which is in the state in which the sensor lever 130 is installed at the support wall 116 and further the spherical body 110 is placed on the curved surface 106 of the placing portion 104.

Figure 2:
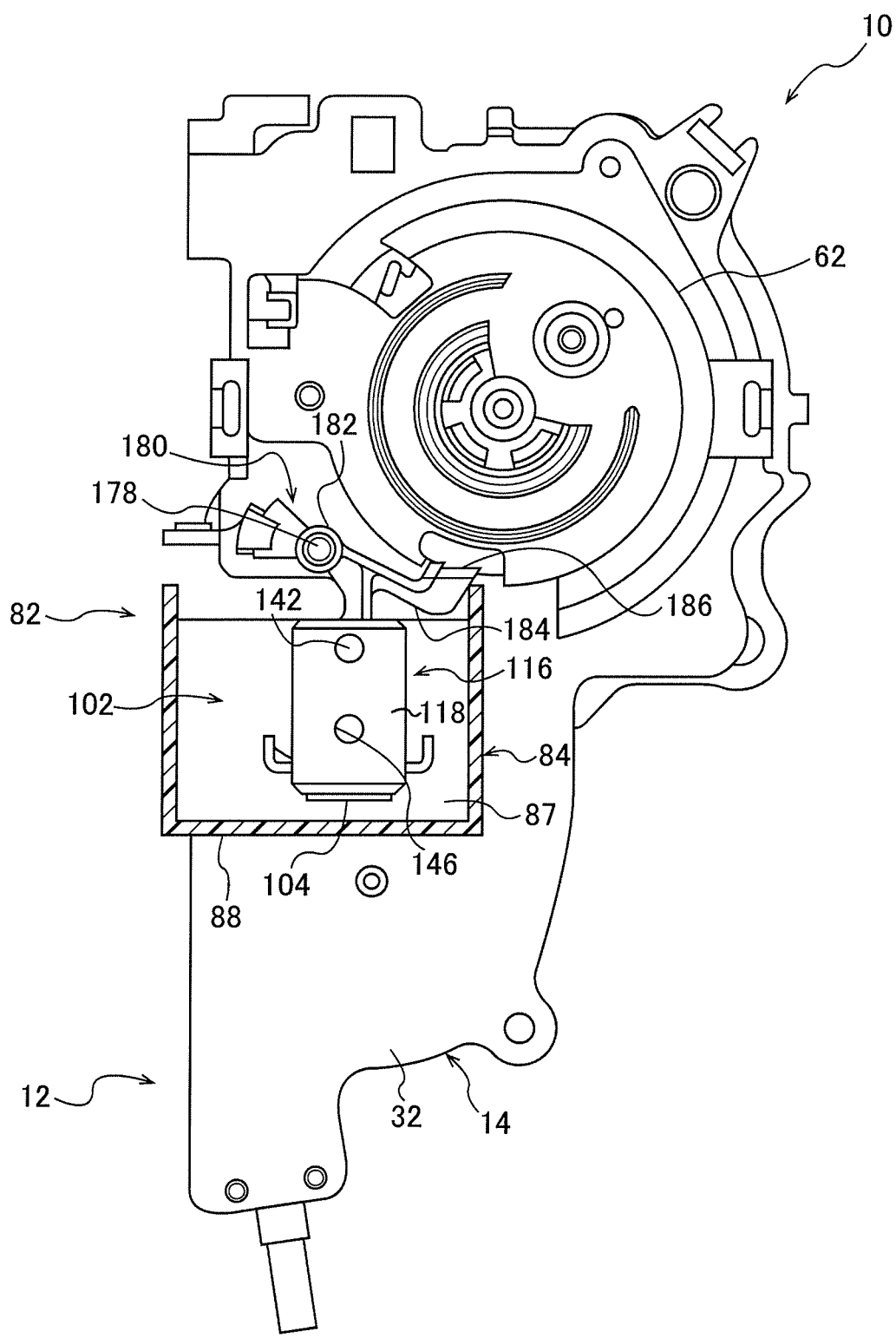
FIG. 2 is a side view schematically showing the structure of the principal portions of the webbing take-up device in accordance with the exemplary embodiment of the present invention.
Figure 3:
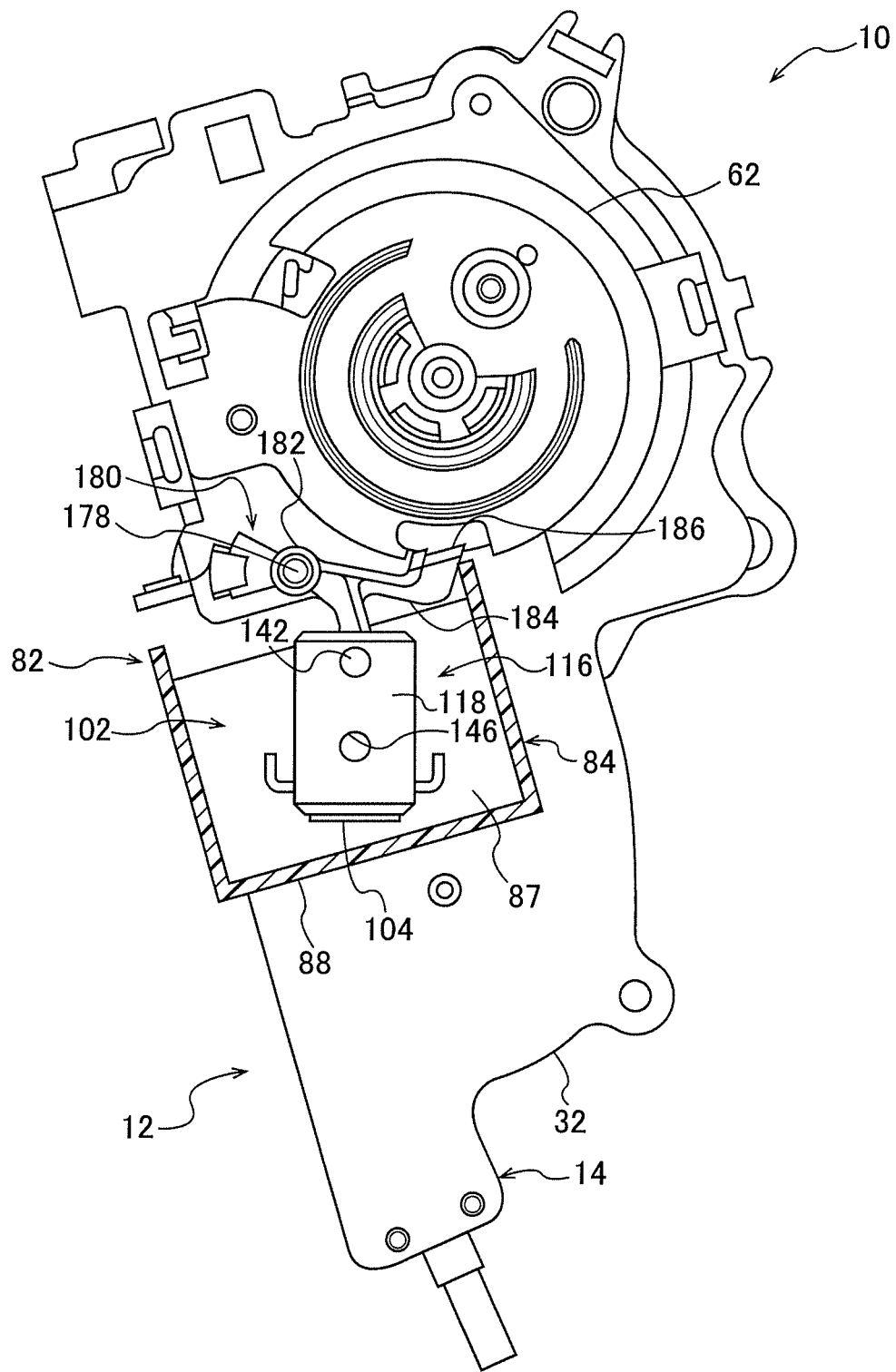
FIG. 3 is a side view, corresponding to FIG. 2, showing a state in which a take-up device main body is tilted.

Therefore, when the take-up device main body 12 tilts as illustrated in FIG. 3 from the state shown in FIG. 2, the sensor housing 102 inertially rotates around the rotating shafts 142 and 150 and maintains its original attitude (that is, the attitude in which the upper face of the placing portion 104 faces vertically upward). Thus, even when the take-up device main body 12 tilts together with the seatback, unwanted rolling of the spherical body 110 (when the vehicle is not sharply decelerating) is avoided.

In the present webbing take-up device 10, the inertial mass body is the spherical body 110 with a spherical shape. Therefore, the center of the spherical body 110, which is to say the center of gravity of the spherical body 110, is easily ascertained. In the present webbing take-up device 10, the positions at which the rotating shafts 142 and 150 are formed are at the upper side than the center position of the spherical body 110 placed on the curved surface 106 of the placing portion 104, so the sensor lever 130 is installed at the support wall 116, further, the positions of formation of the rotating shafts 142 and 150 are upward with respect to the center of gravity of the sensor housing 102 which is in the state in which the spherical body 110 is placed on the curved surface 106 of the placing portion 104. Thus, setting of the positions of formation of the rotating shafts 142 and 150 is simple.

In the present webbing take-up device 10, because the positions of formation of the rotating shafts 142 and 150 are set as described above, even without a heavy body being attached to the lower side of the spherical body 110 and/or the lower side of the sensor housing 102, the sensor housing 102 rotates responsively when the take-up device main body 12 is tilted. Therefore, the acceleration sensor 82 is reduced in size.

Further, in the present webbing take-up device 10, because the inertial mass body is the spherical body 110 with the spherical shape, a structure is formed in which the lock mechanism 52 is operated by the inertial mass body rolling on the curved surface 106. With this structure, it is sufficient for the upper face of the placing portion 104 to be a curved face or angled face that opens upward. Therefore, the structure of the placing portion 104 is simple and uncomplicated.

As an example, in a webbing take-up device that, unlike the present webbing take-up device 10, is provided in a center pillar of a vehicle or the like, the take-up device main body does not tilt, unlike the structure incorporated in the seat back. In this kind of webbing take-up device, a structure in which a lock mechanism is operated by a spherical body rolling in an acceleration sensor such as in the present webbing take-up device 10 is often used. In the present webbing take-up device 10, the spherical body 110 that rolls on the curved surface 106 of the placing portion 104 is used for the initial mass body as described above. Thus, the spherical body used in an acceleration sensor of a webbing take-up device that is provided in a center pillar of a vehicle or the like can also be used as the spherical body used in the acceleration sensor of the present webbing take-up device.

Although not mentioned in the present exemplary embodiment, it is sufficient that the lock mechanism 52 has a constitution capable of operating when the acceleration sensor 82 operates. Therefore, a constitution is possible in which the lock mechanism 52 also operates when a sensor other than the acceleration sensor 82 operates; for example, a sensor that operates when a rotational acceleration in the pull-out direction of the spool 36 is at or above a predetermined magnitude.

While there are benefits as described above in the spherical body 110 that serves as the inertial mass body having a spherical shape, the shape of the inertial mass body is not limited to the spherical shape. For example, constitutions are possible in which the inertial mass body is a non-spherical body such as a circular rod shape, a disc shape, a rectangular parallelepiped shape, a conical shape or truncated cone shape in which a lower surface is a protruding curved surface, or the like.

The present exemplary embodiment has a constitution in which rotation of the lock base 54, and hence the spool 36, in the pull-out direction is restricted by the lock pawl 58 provided at the lock base 54 meshing with the ratchet teeth of the ratchet hole 60 formed in the leg plate 32 of the frame 14. However, the constitution of the lock mechanism is not limited to this constitution. For example, the lock mechanism may have a constitution in which ratchet teeth are formed at an outer periphery portion of the lock base 54, and rotation of the lock base 54 and hence the spool 36 in the pull-out direction is restricted by a pawl provided at the leg plate 32 of the frame 14 or the like meshing with the ratchet teeth of the lock base 54.

Although not particularly recited in the present exemplary embodiment, a constitution is possible in which a weight is provided at the support wall 116 of the sensor housing 102 or the like in accordance with requirements, such as a rotating angle required of the sensor housing 102 and the like. In the case of such a constitution in which a weight is provided at the sensor housing 102, the position of formation of the rotating shaft 142 at the longitudinal wall 118 of the support wall 116 and the position of formation of the rotating shaft 150 at the longitudinal wall 114 are set to be upward with respect to the center of gravity of the sensor housing 102 including this weight.

In regard to the present invention, it is sufficient that a structure is provided in which the sensor housing 102 relatively rotates by inertia with respect to the take-up device main body 12 that rotates to tilt. Therefore, structure may be added in which, for example, a tilt detection unit constituted to include a moving body that moves in conjunction with (in interlocking manner) inclination of the seatback or integrally with the seatback is provided at the seat, the moving body of the tilt detection unit and the sensor housing 102 are connected by a mechanical link such as a wire, a cable or the like, and the sensor housing 102 is operated in conjunction with the moving body.

The webbing take-up device 10 according to the present exemplary embodiment is a structure that is incorporated in a seatback structuring a seat having a reclining mechanism. However, a location of installation of the present webbing take-up device 10 is not limited to the inside of a seatback. The webbing take-up device 10 may be installed at locations other than a seatback in a vehicle, such as the inside of a seat cushion, to the side portion of a seat, at a center pillar or roof or the like of a vehicle, or the like.

What is claimed is:

1. A webbing take-up device comprising:
a take-up device main body, that includes a spool that takes up a webbing by rotating in a take-up direction, and a lock mechanism that, by being operated, restricts rotation of the spool in a pull-out direction opposite to the take-up direction; and
an acceleration sensor at which an inertial mass body is placed, the inertial mass body operating the lock mechanism by moving inertially due to a sharp deceleration of a vehicle, the acceleration sensor including a housing that is provided at the take-up device main body such that the housing is rotatable about a predetermined rotating axis with respect to the take-up device main body, wherein a position of the rotating axis of the housing is set at the upper side with respect to a position of a center of gravity of the housing including the inertial mass body, wherein the housing includes a placing portion on which a spherical body that is the inertial mass body is rollably placed, the placing portion being formed in a recessed shape that opens toward a side of the rotating axis, the position of the rotating axis is set such that the center of gravity of the housing including the spherical body is disposed between the placing portion and the rotating axis, and the position of the rotating axis is set at the upper side with respect to a position of the center of gravity of the spherical body which is in a state in which the spherical body is placed on the placing portion.

2. The webbing take-up device of claim 1, wherein a position of an axial center of the rotating axis of the housing is set at the upper side with respect to the most upward portion of the inertial mass body which is in a state in which the inertial mass body is placed on the housing.

* * * * *